United States Patent [19]

Etter

[11] Patent Number: 5,022,876
[45] Date of Patent: Jun. 11, 1991

[54] TRANSMISSION MEANS

[76] Inventor: D. Christopher Etter, 503 E. S. Countyline Rd., Indianapolis, Ind. 46227

[21] Appl. No.: 425,489

[22] Filed: Oct. 23, 1989

[51] Int. Cl.$^5$ .............................................. B63H 23/02
[52] U.S. Cl. ........................................ 440/63; 440/53
[58] Field of Search ................ 440/4, 53, 54, 49, 57, 440/83

[56] References Cited

U.S. PATENT DOCUMENTS

| | | | |
|---|---|---|---|
| 486,684 | 11/1892 | Salisbury | 440/83 |
| 864,624 | 8/1907 | Douglas | 440/83 |
| 1,139,631 | 5/1915 | Blakely | 440/83 |
| 1,309,975 | 7/1919 | Wright | 440/83 |
| 2,880,689 | 4/1959 | Bokowski | 440/83 |
| 2,961,988 | 11/1960 | Wood | 440/83 |
| 4,854,903 | 8/1989 | Sirois | 440/83 |

Primary Examiner—Joseph F. Peters, Jr.
Assistant Examiner—Clifford T. Bartz
Attorney, Agent, or Firm—Robert A. Spray

[57] ABSTRACT

Torque-transmitting accommodation of substantial non-alignment of rotational shaft mechanism, particularly for interconnecting a boat motor's output means (generally vertical) and the boat's submerged propeller shaft (generally horizontal). The accommodation of non-aligned portions of the transmission is provided a flexible drive shaft member, particularly here a tightly-coiled multi-layered cable, insheathed in curved tubing and the cable's flexibility provides capability of rotation in spite of a substantial bend in the transmission of the rotational power.

10 Claims, 1 Drawing Sheet

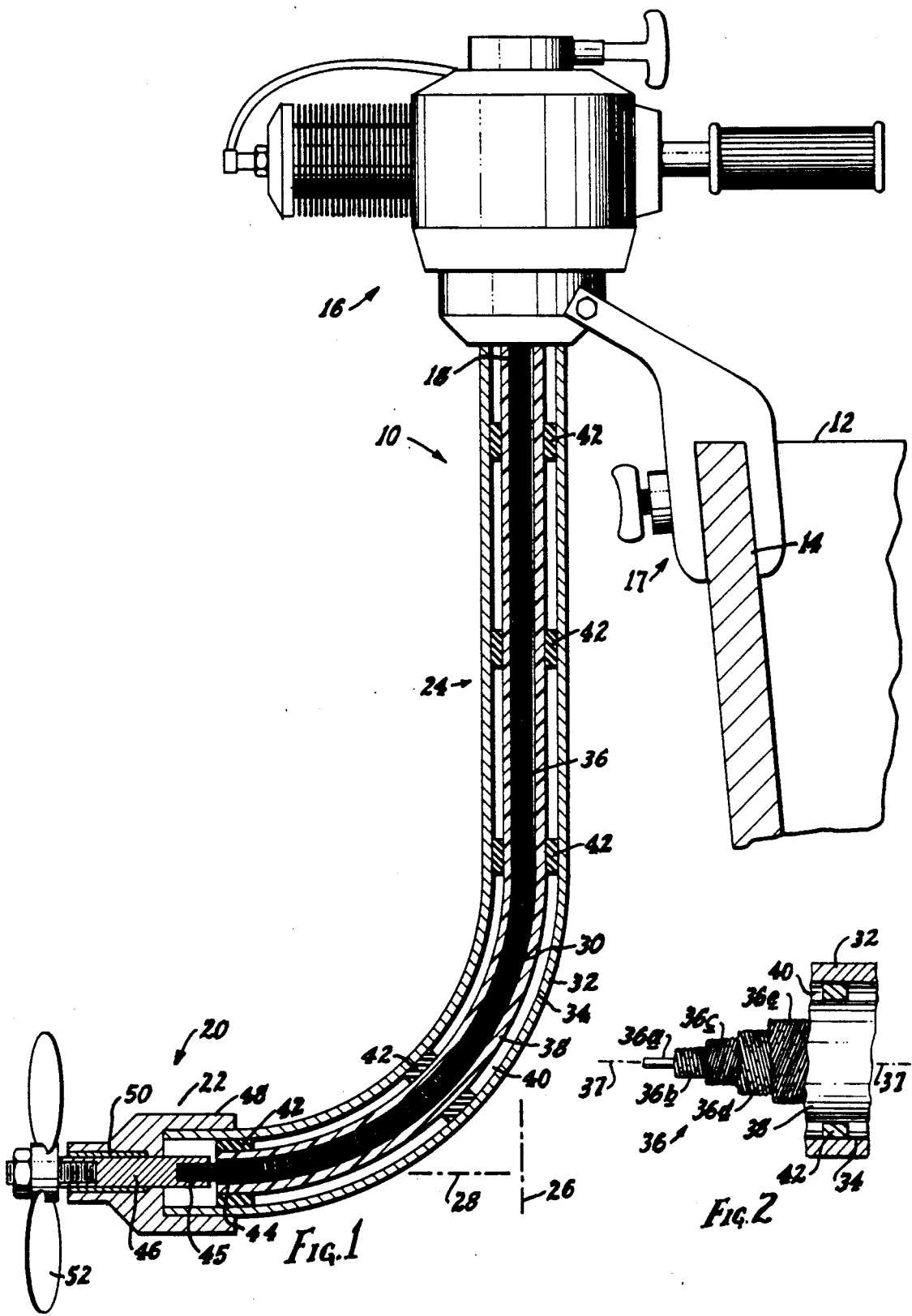

TRANSMISSION MEANS

I. FIELD AND BACKGROUND OF THE INVENTION

The present invention relates to transmission devices; and more particularly, as the inventive concepts are shown herein, to transmissions in which there is a substantial non-alignment of portions of the transmission.

Still further, the present invention relates to and provides novel and advantageous transmission means, which provide relatively simple and economical means for transmitting rotational power, especially for boats, by providing the accommodation of the substantial non-alignment along a boat's power shaft mechanism which interconnects the motor's output means and the boat's submerged propeller shaft.

Boats of various kinds, and whether of "inboard" or "outboard" nature, are especially a desired field of use of this invention; for boats may be considered as mechanisms of a relatively light-duty nature, and their use inherently requires that the power of their transmission-portions be rotationally transmitted from a source along a certain direction but delivered by the transmission to a rotational power-use in a substantially different direction.

With boats, those directions of rotational power requirements, respectively, are generally vertical (at the motor output) and generally horizontal (at the propeller); and these characteristics of use are particularly those of this invention's characteristics of advantageous accomplishment, i.e., in that the rotational power is transmitted between parts of the transmission whose non-alignment is as much as about 90 degress.

II. SUMMARY OF THE INVENTION

In a brief summary of the invention, it provides an economical means of torque-transmitting accommodation of the substantial non-alignment of the power shaft mechanism which interconnects the motor's output means (generally vertical) and the submerged propeller shaft (generally horizontal).

More particularly, the torque-transmitting accommodation is provided to be by a flexible drive shaft member, in contrast to direction-changing means such as by a conventional plural-component shafting and gearing assembly, of conventional outboard motor transmission assemblies.

And even more particularly, the preferred embodiment uses a tightly-coiled multi-layer cable, insheathed in a flexible tubing means, to provide the mechanism of the rotational power transmission; and the cable's flexiblity provides capability of rotation in spite of a very substantial bend in the transmission of the rotational power, as the cable twists within the stationary tubing.

III. THE INTENTIONS COMPONENTS AND CONCEPTS ARE SIMILAR TO THOSE AVAILABLE IN THE PRIOR ART, EXCEPT FOR THE PRESENT CONCEPTS IN PARTICULAR

In a hindsight consideration of the present invention to determine its inventive and novel nature, it is not only conceded but emphasized that the prior art had details usable in this invention but only if the prior art had had the guidance of the present concepts of the present invention.

That is, it is emphasized that the prior art had several particulars which individually and accumulatively show the non-obviousness of this combination invention:

a. The prior art has long had mechanisms of various types which required torque transmission of non-aligned shafts;

b. The prior art knew the advantages of economy of parts, for economy of production, repair, maintenance, etc., as a general principle;

c. The prior art has long had the problem of installation, specifically including the features of boat motor power transmission, which require rotational torque to be transmitted between shafts of 90-degree non-alignment;

d. The prior art has long known of the expense of gearing, angle gear boxes, etc., yet gear-type transmissions have been continued;

e. The prior art has used flexible drive shafts in relatively light-duty mechanism, even in the transmission of rotary power in such devices as manually-held weed cutters which are comparable in power requirements to boat motor uses;

f. The prior art has used, in those other devices, a tightly-coiled and multi-layer cable as the flexible shaft member in a hollow tubular support body, for achieving rotary power in a device of substantial non-alignment of its transmission portions;

g. The prior art has used wire-type mechanisms even as to mechanisms of boats.

IV. MORE PARTICULARS HELP SHOW THE INVENTION'S NATURE AS INVENTIVE

The prior art has used various flexible component devices in various mechanisms, and the existence of such articles, even those of a flexible cable of tightly coiled and multi-layered nature is not only conceded, it is emphasized; for as to the novelty here of the invention as considered as a whole, a contrast to the prior art helps show its contrast to the present concepts, and emphasizes the advantages and the inventive significance of the present concepts as are here shown, and the nature of the concepts and their results can perhaps be easier understood.

Even further as indicating the inventive nature of the present concepts is the result of a Preliminary Patentability Search made in the Search files of the U.S. Patent Office, after this invention was made, and during the course of considering the desire and likelihood of patent protection.

The Search produced the following, all U.S. Patents

| U.S. Pat. No. | Inventor | Grant date |
| --- | --- | --- |
| 3,752,111 | Meynier, Jr. | 8/14/73 |
| 4,417,879 | Kulischenko | 11/29/83 |
| 4,596,529 | Goodman | 6/24/86 |
| 4,676,756 | Rodrique et al. | 6/30/87 |
| 4,678,440 | Rodrique et al. | 7/07/87 |

However, these references fail to show or suggest the details of the present concepts, and a realistic consideration of their several differences from the present concepts may more aptly be described as teaching away from the present invention's concepts, in contrast to suggesting them, even as to a hindsight attempt to perceive suggestions from a backward look into the prior art.

For example, U.S. Pat. No. 3,752,111 shows a boat with a cable, but apparently the cable ends are used by pulling on them for a steering effect rather than for actuating a propelling or drive means.

U.S. Pat. No. 4,417,879 has a flexible and rotatable cable, but it appears to control steering rather than have or provide a boat-propulsion effect.

U.S. Pat. No. 4,596,529 shows control or actuation wires, but they are wires of an electric circuit rather than providing mechanical drive means.

U.S. Pat. Nos. 4,676,756, and 4,678,440, both by the same joint inventors and having the same disclosure, although reported by the search seem more remote than the others, as to any flexibility of the mechanical drive means; for the text of both patents mentions that the propeller shaft is made of rigid material.

Accordingly, although various concepts of non-alignment of rotational shafts, and even flexible power shafts of multi-layer coiled cable, are conceded and emphasized to have been known and used in the prior art, nevertheless, the prior art not having had the particular combination of concepts and details as here presented, and shown as a novel combination for boat-propulsion, different from the prior art and its suggestions, even only a fair amount of realistic humility, to avoid consideration of this invention improperly by hindsight, requires the concepts and achievement here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art of all relevant fields.

V. BRIEF DESCRIPTION OF THE DRAWINGS

The above description of the novel and advantageous invention is of somewhat introductory and generalized form. More particular details, concepts, and features are set forth in the following and more detailed description of an illustrative embodiment, taken in conjunction with the accompanying drawing, which is of somewhat schematic and diagrammatic nature, for showing the inventive concepts:

FIG. 1 is a vertical cross-sectional view of the transmission and propulsion unit of an "outboard" boat motor, the motor and boat being shown only schematically for showing the transmission and propulsion means in relation to the motor and boat.

FIG. 2 is an enlarged but fragmental view of preferred drive cable, formed by multiple layers of spirally-wound stiff wire over a single base-wire; and the view is shown with successive layers torn away to illustrate inner layers.

VI. DETAILED DESCRIPTION OF ILLUSTRATIVE EMBODIMENT

As shown in the drawings, the present invention provides a novel and advantageous propulsion means 10 for a watercraft 12, the watercraft 12 here being shown merely fragmentally by its transom 14.

The invention assumes, in a typical use, that the watercraft 12 would be of light weight; and, although the type of the watercraft 12 is not precisely critical, if a boat it would be sturdy enough that the power means 16 of the propulsion means 10 would be mounted on the watercraft 12, here by a clamp 17.

The boat's power means 16 typically would have its power output means 18 for receiving power from the motor or power means 16, and for imparting the power of the power means to a driving means assembly 20 submerged in the water at a craft-propelling location 22 which is vertically spaced from the power output means 18.

Here, as shown, the propulsion means 10, as a major component or sub-assembly, includes a power transmission means 24 for receiving power from the motor's power output means 18 by transmission of powered rotation about a first axis 26, and for transmitting that rotational power from the power output means 18 and delivering the power to the submerged driving means 20 by rotation about a second axis 28; and even more significant to the present invention, the first axis 26 and the second axis 28 are substantially non-aligned.

That typical non-alignment is due to the mounting of the motor 16 to generate powered rotation about an axis (26) which is substantially vertical, whereas the submerged driving means 20 is on an axis 28 which is substantially horizontal.

In accordance with concepts of the present invention, and as illustrated, it is provided that the power transmission shaft means 24 includes a substantial portion 30 of transmission means 24 to be of a flexible nature which is sufficiently flexible so as to operatively interconnect, along non-aligned axes, i.e., the axis 26 of the power output means 18 and the axis 28 of the submerged driving means 20, in a power-transmitting manner; for the invention provides the means which accommodates the substantial non-alignment of those axes 26/28.

More particularly as shown, the flexible portion 30 of the power transmission means 24, that flexible portion 30 in FIG. 1 being shown as its entire length between locations 18 and 22, is within a tubular outer member 32 having a hollow bore 34; and in the bore 34 the flexible power means 36 is a flexible shaft means or flexible cable 36 which is capable of transmitting power by rotation about its own axis 37 even though the cable or shaft 36 is bent about a relatively short radius of curvature.

The cable 36 as shown is formed of tightly-coiled spirally wound cable (as illustrated in FIG. 2, items 36b thru 36e); and it is preferably insheathed in a curved plastic tube 38, preferably nylon, the tube 38 being of a size having a free and running looseness of fit around the cable 36; and this fit of the tube 38 into the outer tubular member 32 is such as to leave significant clearance between those components, i.e., leaving an annular gap 40 between tubes 38/32, as a part of the bore 34.

More particularly as to the cable 36 here shown, and as illustrated particularly in FIG. 2, the cable 36 comprises a central base wire 36a upon which is tightly wound multiple layers of stiff wire, successive ones of which being of opposite hand. The layer 36b most adjacent the central wire 36a is of 3-lead nature, the next layer 36c is of 4-lead nature, the next layer 36d is of 5-lead nature, and the outer layer 36e is of 6-lead nature.

A series of ring-like spacers 42, preferably rubber, provide spaced support bushings between the two tubes 32/38 and keep the tubes 38 and cable 36 generally co-axial with the axis of the outer tube 32 all along the span of the curved portion 30 of the power cable 36, and here for the full span between locations 18/22. Tube 32, especially with the series of ring-like spacers 42 snug against both tubes 32 and 38, provides good support of tube 38 which itself supports the cable 36 in its energetic twisting movement as it revolves.

As to the submerged location 22 of the drive means 20, the lower end 44 of the cable 36 is shown as firmly held (45) in an axial bore of a propeller spindle 46, and the outer tubular member 32 is firmly held down there in a generally cylindrical housing 48 having an oilite bearing 50 which rotatably receives the propeller spindle 46; and the propeller spindle 46 carries the propeller 52 of the drive means 20.

VII. CONCLUSION

It is thus seen that a propulsion means for a watercraft, constructed and used according to the inventive concepts herein set forth, provide novel concepts of a desirable and advantageous device, yielding the advantages of an overall combination of a flexible cable as the transmission means for non-aligned power shafts, which in overall combination is conceptually different from the prior art even though transmissions embodying a coiled cable insheathed in a tube, as a basic concept, have been known for years; yet significantly this particular combination of prior art in the field of boat motors and similar mechanisms has not been suggested by the prior art, this achievement being a substantial and advantageous departure from prior art, even though the prior art shows attempts at variations as to motor transmissions for many years. And particularly is the overall difference from the prior art significant when the non-obviousness is viewed by a consideration of the subject matter as a whole, as integrally incorporating a combination of features as different from the prior art, in contrast to merely those details of novelty themselves, and further in view of the prior art teaching away from the particular and inter-related concepts and features of the present invention.

In summary as to the nature of these advantageous concepts, their inventiveness is shown by novel features of concept and construction shown here, in novel and advantageous combination, not only being different from all the prior art known, but because the achievement is not what is or has been suggested to those of ordinary skill in the art, especially realistically considering this as comprising components which individually are similar in nature to what is well known to most persons skilled in this art for many years. No prior art has suggested the modifications of any other prior art to achieve the novel concepts here achieved, with the various features providing their own functions in the overall combination.

Accordingly, it will thus be seen from the foregoing description of the invention according to this illustrative embodiment, considered with the accompanying drawing, that the present invention provides new and useful concepts of a novel and advantageous power mechanism device having and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown. Thus, e.g., although the invention is shown and described as to an outboard boat motor, the advantageous combination is achieved with other watercraft motors, taking advantage of the operativity of a flexible cable as a power transmission component.

Thus also, e.g., it is to be understood that words such as "propeller" are used representatively, in the broad sense, i.e., of not only a 2-blade type propeller as shown but also impellers and/or whatever is a use of rotational power having along one portion a significantly different rotational axis than elsewhere in the overall transmission. Also, the word "non-aligned" is not to be considered as precisely the 90-degree amount of bend of the illustrative embodiment.

The concepts of the invention, and its operatively, are not limited to any certain curvature, radius of curvature, proportion of the overall transmission means as comprising flexible shaft or cable, etc.; and thus words such as "significantly" and "substantially" are used herein in an operational sense.

I claim:

1. A propulsion means for a watercraft having a power means carried on the craft,
   and having power output means for receiving power from the power means and for imparting the power to a driving means submerged in the water at a craft-propelling location spaced from the power output means,
   and also having power transmission means for receiving power from the power output means by rotation about a first axis, and for transmitting the power from the power output means and delivering the power to the driving means, the driving means having rotation about a second axis,
   the first axis and the second axis being significantly non-aligned,
   in which the power transmission means includes a significant portion of the power transmission means to be of flexible nature sufficient to operatively interconnect the power output means and the submerged driving means, and accommodate the non-alignment of the first axis with respect to the second axis,
   and in which the flexible portion of the power transmission means is disposed in a tubular member having a hollow bore, the power transmitting means comprising a flexible power-transmitting cable which is capable of transmitting power by rotation about its own axis even though the cable and the tubular member are significantly curved to accommodate said non-alignment,
   the cable being provided as a spirally wound cable of a plurality of windings, successive windings being of opposite hand.

2. The invention as set forth in claim 1, in which the said cable is insheathed in a curved plastic tube, and the cable and plastic tube are carried in the bore of the tubular member.

3. The invention as set forth in claim 2, in which the plastic tube is of an outer diameter less than the inner diameter of the tubular member, and a series of supporting spacer rings are provided outwardly along the plastic tube and inwardly along the tubular member, keeping the plastic tube and tubular member generally aligned, and leaving an annular gap therebetween.

4. The invention as set forth in claim 3, in a combination in which the cable is connected to the driving means by being held in an axial bore thereof.

5. The invention as set forth in claim 1, in a combination in which the cable is connected to the driving means by being held in an axial bore thereof.

6. A power transmission means for a watercraft having a power means, a transmission means, and a propulsion means spaced from the power means, the power means having a power output means for receiving power from the power means and for imparting the power to the transmission means, and the transmission means receiving power from the power output means and transmitting the power to the propulsion means, the power output means being rotatable about a first axis; and the portion of the transmission means which imparts power to the propulsion means being rotatable about a second axis, the first axis and the second axis being significantly non-aligned, in which the transmission means includes a substantial portion being of flexible nature, that portion having ends respectively disposed along said first axis and second axis, respectively, and transmitting power by its rotation about its axis even though its ends are disposed along said non-aligned axes, and a curved tube supportive of the transmission means in its rotation about its axis, in a combination in which the flexible nature portion of the transmission means comprises a spirally-wound cable, and the cable has a plurality of layers of windings, successive windings being of opposite hand.

7. The invention as set forth in claim 6 in a combination in which there is provided an outer tube, and the cable and first-mentioned tube are carried in the bore of the outer tube.

8. The invention as set forth in claim 7 in a combination in which the first-mentioned tube has an outer diameter less than the inner diameter of the outer tube, and a series of supporting spacer rings are provided outwardly along the first-mentioned tube and inwardly along the outer tube, supporting the first-mentioned tube and the transmission means carried within its bore.

9. The invention as set forth in claim 8, in a combination in which the cable is connected to the propulsion means by being held in an axial bore thereof.

10. The invention as set forth in claim 6, in a combination in which the cable is connected to the propulsion means by being held in an axial bore thereof.

* * * * *